UNITED STATES PATENT OFFICE.

WALTER K. FREEMAN, OF OSCAWANA, NEW YORK, ASSIGNOR TO HYDROLOSE PROCESS CORPORATION, A CORPORATION OF NEW YORK.

METHOD OF TREATING WASTE SULFITE LIQUOR AND PRODUCT PRODUCED THEREBY.

1,175,423.  Specification of Letters Patent.  Patented Mar. 14, 1916.

No Drawing.   Application filed November 25, 1913.  Serial No. 803,044.

*To all whom it may concern:*

Be it known that I, WALTER K. FREEMAN, a citizen of the United States, residing at Oscawana, in the county of Westchester and State of New York, have invented certain new and useful Improvements in Methods of Treating Waste Sufite Liquor and Products Produced Thereby; and I do hereby declare the following to be a full, clear, and exact description of the invention, such as will enable others skilled in the art to make and use the same.

My invention consists in a method of treating sulfite waste liquor, a waste product of the wood pulp mills, to convert said liquor into new and useful compositions of matter, and the subsequent treatment of the compositions in various ways, or mixing them with various chemicals or substances to produce other new compositions of matter which may be used in the manufacture of a great variety of articles differing widely in their character and uses.

My invention also covers the product.

In order to understand the principal ingredients of the sulfite waste liquor, and to appreciate the large percentage of wood passing off therein, it may be well to consider briefly the sulfite pulp process for the manufacture of paper, in the course of which this by-product results.

Sulfur is first burned and the gas given off is cooled and passed into a tower in which lime rock is distributed, then water is caused to flow over the surface of the rock, dissolving part of the calcium and sulfur to form bisulfite of lime solution having a percentage of free sulfurous acid. This liquid is then brought into contact with wood chips placed in a closed digester and boiled under a pressure of about sixty pounds, for several hours. The softened wood is then beaten and washed to free it from the chemicals, after which it is bleached, gathered and distributed to the calenders and formed into various kinds of paper. In practice, approximately 40% of the original weight of the dry wood is recovered for use in the manufacture of paper. The remaining 60% of the original dry wood, plus the chemicals, about 300 pounds of sulfur and 200 pounds of lime per ton of wood, pass off in the sulfite waste liquor. It is apparent from this calculation that more than the value of the paper pulp as such, is lost in the art of making it. It is also apparent that only the stronger and more matured cellulose constituents can withstand this treatment without being dissolved, so that all of the original wood other than the matured cellulose is lost and goes off with the chemicals and water to make up this sulfite waste liquor. The lost part of the original wood consists of the primitive lignin-cellulose, the primitive and formative cells, protoplasm, resins and other secretions of the wood and such of the matured cells as have been dissolved in the process of digestion. The yearly loss to paper manufacturers from this large percentage of wasted wood amounts to millions of dollars, and aside from this enormous loss, the sulfite waste liquor, on account of its offensive odor, has been a nuisance to manufacturers, and its poisonous and acrid ingredients cause such serious pollution of the streams into which it is emptied that it has become a subject of legislation in some States.

Certain of the chemical elements found present in this sulfite waste liquor, among which are the spent bi-sulfite of lime and the sulfurous acid, prevent the solids of the waste liquor from entering into combination with other chemicals to form any composition or compound useful for any purpose now known.

By my method of treating sulfite waste liquor, I am enabled to eliminate from the liquor those elements that prevent the solids therein from entering into chemical combination or mixture with other substances to form useful compositions of matter.

In carrying out my invention, I first partially evaporate the liquid, then treat it with a salt solution to effect coagulation of some of the ingredients of said liquor, and then add a suitable precipitant to convert the remaining sulfurous compounds, preferably to inert solids; after which the resulting substantially neutral syrup with or without the precipitates may be bleached, evaporated down to an anhydrous mass, and ground into a powder. This powder may then be mixed with a suitable oxy-chlorid bond such as magnesium oxid and chlorid or any other suitable oxy-chlorid bond, and ground therewith into a powder from which numerous fireproof and resistant articles of varying hardness and elasticity may be made, with or without other ingredients.

I have found in practice that the method of treating the sulfite liquor in accordance with my invention may be varied at different steps in the process, and that certain ingredients in the waste liquor may be recovered during the method of treating the same to obtain the compositions of matter which form one of the objects of this invention; but in order to aid those skilled in the art in a thorough understanding of the invention and the manner of practising the same, I will set forth in detail what I have found to be an efficacious manner of treating the waste liquor for the purpose intended.

I first run the sulfite waste liquor into an acid resisting tank, where the liquor is partially evaporated to increase its density so as to economize in the amount of chemicals with which the liquor is subsequently treated. I have found in practice that for the best results the liquor should first be evaporated down to about 20% to 30% of solids. The resulting liquor is then run into a beater where it may be partially cooled or cooled below 150° F., after which a sufficient amount of a coagulating agent is added to the liquor. The object of allowing the syrup to partially cool before adding the coagulating agent is to prevent the vaporization of a considerable portion of the volatile elements of the agent which would occur if the temperature were kept too high. In practice, I have found that an active sodium salt, and preferably sodium chlorid, is very satisfactory, but any halogen salt of an alkali base may be used. The hot semi-solid or syrupy liquor is then beaten while the temperature is maintained at approximately 200° Fahr. until there are indications of coagulation of the solids from the water element. The salt, under these conditions, apparently effects the coagulation or curdling of some of the components of the liquor, as it is well known that salt or sodium chlorid is markedly effective in coagulating some albuminoids. The syrupy substance is then drawn into a settling tank preferably provided with an air or mechanical agitator, where it is allowed to stand for several hours until separation is evidenced, and when at a temperature of about 100° Fahr., a small percentage of a suitable precipitant, such as a chlorid of the alkali earth metal group, and preferably barium chlorid, is added and the mixture agitated for a sufficient length of time to thoroughly intermix and distribute the chlorid through the mass so as to bring it into intimate contact with the sulfur, calcium and acid constituents of the liquor to cause precipitation. I have found in practice that barium chlorid is best suited as a precipitating agent, as it seems to be most active on the sulfurous acids, creating, as it does, an insoluble compound of the sulfur ingredient of the waste liquor to form barium sulfite, and possibly other compounds of barium and sulfur. I have also found in practice that a saturated solution of barium chlorid, in amount approximately 2% of the solids of the syrup, effects satisfactory and efficient precipitation where the syrup has been treated with the salt but the barium chlorid crystals may be introduced without dissolving them. The addition of barium chlorid at this stage seems to accelerate "gathering" or aggregation of the coagulated portions into larger masses.

When it is desired to separate the wood derivatives or constituents from the precipitates thus formed, the entire mixture, including the precipitates, is run into a comparatively deep settling tank where the precipitates are allowed to settle and the syrupy part of the mixture containing the wood derivatives is then drawn off. The drawn off liquor is practically black, and hence any derived product would not be suitable for the manufacture of light colored articles without first bleaching the composition to remove the coloring matter therefrom. In doing this I preferably cool the syrup down to approximately normal temperature and bleach the same by any suitable process such as the electrolytic ozone process or by chlorin gas, or by direct electrolytic action, during which step further precipitates are formed, and a furfural scum rises, all of which may be separated from the liquor, leaving a fluid of lighter color, the shade or tone of which may be governed by the degree of bleaching.

After bleaching the composition, if bleaching is desired, I run the bleached syrup composition together with the precipitates into an evaporating chamber preferably provided with a vacuum arrangement to facilitate drying at a lower temperature, and in this chamber I evaporate the composition down to approximately 80 to 90 per cent. of solids. The resulting composition is a brittle mass which may then be reduced to powder and shipped in suitable containers. For the sake of convenience I shall designate the syrup and the precipitates together whether they be in liquid or solid condition "xylium."

After precipitation has taken place as above set forth, the syrupy mass which is drawn off or separated from the precipitates, contains the wood derivatives recovered from the former sulfite waste liquor, which derivatives consist of the primitive lignin-cellulose, the primitive and formative cells, and resins and other secretions of the wood and such of the matured cells as have been dissolved in the process of digestion. For the sake of convenience, in referring to this new composition of matter without the precipitates, I will designate the same as "xylozo." The term is to designate this new composition of matter in any form, whether in the syrupy semi-solid state, bleached or unbleached, or after being evaporated down to an anhydrous mass and reduced to powder.

The inert precipitate or solids from which the syrupy mass is drawn off or separated, contains the neutralized spent chemical compounds of the sulfite waste liquor such as the sulfur calcium compounds, and this precipitate may be ground up and used with suitable mixtures for roofing and other purposes. To this precipitate I apply the term "xylosca."

If the anhydrous mass is to be used in the manufacture of large articles or in coarser work, the syrupy substance need not be allowed to stand to facilitate precipitation, since the chemical compounds distributed through the liquor need only be reduced to inert substances, in which case the entire syrupy mixture, may be evaporated down to an anhydrous mass after or without bleaching. The three words, "xylium," "xylozo" and "xylosca" are derivatives of the Greek word xylon meaning "wood," and I believe them to be appropriate terms by which the new compositions of matter may be designated; the first being the genus and the others species under the genus.

If desired, the powdered anhydrous composition "xylium" may be mixed with suitable proportions of a suitable dry metallic oxid such as dry magnesium oxid, and the two reduced to a powdered form, or the anhydrous powdered composition may be mixed with a suitable amount of a dry metallic oxid and chlorid such as magnesium oxid and chlorid and ground up to form a powder. Other oxy-chlorids such for instance as zinc, barium, aluminum or platinum, oxids and chlorids, may be substituted for the magnesium oxid and chlorid. This powder may be used alone or with other ingredients, and when moistened with water may be used to form various fireproof and moisture-proof articles of varying hardness and elasticity. The powder should be kept in air-tight containers.

It is immaterial to my broad invention whether the recovered by-product "xylium" is broken up and ground together with the metal oxid alone having a suitable amount of a chlorid solution added at the time that the powder is to be used, or whether it is broken up and ground with the oxid and chlorid in one operation to form the resulting powder. The oxy-chlorid bond and the resulting composition may be mixed in any suitable manner so long as the three ingredients are brought into intimate contact to bring about the proper chemical action to perform the desired result.

In practice, I have found that it is preferable to reduce the anhydrous mass to a fine powder, and then thoroughly mix this powder with a substantially equal part by weight of dry powdered magnesium oxid and a half part by weight of dry powdered magnesium chlorid to form the resulting composition. The method of mixing these ingredients in practice, and whether the metal chlorid is to be ground in with the metal oxid or added later as a chlorid solution, will depend entirely upon the facilities and convenience to the manufacturer.

The "xylosca" or "xylozo" oxy-chlorid powder may be mixed in a suitable manner with fibrous material and other ingredients properly treated, from which mixture plasterboards, etc., may be made. These boards are practically fireproof and moisture-proof and have the desired degree of elasticity to receive and hold nails and to withstand various uses. The xylosca or xylozo oxy-chlorid powder may likewise be mixed with different ingredients and suitably treated to form a flooring composition which is fireproof, less affected by moisture than the well known plastic "cement," and which has a degree of elasticity which will permit it to be cut or drilled without cracking, which makes it more suitable for flooring.

I have found in practice that the "xylium" powder, by being suitably treated by different processes, may be used in the manufacture of molded articles, such as billiard balls, lasts on which rubbers may be vulcanized, insulating articles for electrical apparatus, or for picture-frames and fresco work; and it is better suited for the manufacture of these articles than anything now on the market for such purposes. I have also found this powder useful in making a composition useful as lithographers' stone, and which has valuable qualities as such. I have found in practice that the articles which may be made from this powder and which have highly useful qualities, range from translucent glasslike substances down to flooring.

I am aware that the sulfite waste liquor contains a certain percentage of carbo-hydrates convertible into alcohol, and by adding a suitable fermenting agent, to the neutral partially evaporated sulfite waste liquor and allowing it to stand, fermentation will take place, after which the alcohol may be distilled off from the syrupy liquor and recovered. About nineteen gallons of alcohol per ton may be recovered at a cost of about twenty-two cents per gallon, without affecting the character of the remaining syrupy liquor so far as concerns its subsequent method of treating or the resulting composition obtained therefrom by my invention. In practice, the recovery of this alcohol only requires the substitution of a different evaporating chamber with suitable apparatus for recovering the alcohol therefrom, though the scum formed in the fermentation process should be removed, before the liquor remaining is treated.

I am also aware that there is from 5½ to 6 3/10 per cent. tannic acid present in the sulfite waste liquor, and when the waste liquor is neutralized and evaporated to syrupy "xylium," the tannic acid remains in the mixture, and I have found in practice that the "xylium" may be used for tanning leather, and that leather tanned with this substance is of a peculiarly fine quality.

The syrupy "xylozo," containing as it does, the primitive lignin-cellulose resins, oils, and primitive cells, when bleached may be used in the manufacture of soap. I have found in practice that a very fine quality of soap may be easily and very economically made from this syrupy "xylozo." I have also found that the syrupy "xylozo" may be readily treated to form a compound which may be used as an ingredient in making water colors which have the character of retaining their color in a measure unknown in any of the colors now on the market.

Having this disclosure of my broad invention for the recovery of the wood derivatives and chemical constituents of the sulfite waste liquor of wood pulp mills, changes in the method of recovery and substitutions in the ingredients used may suggest themselves to those skilled in the art, and while I have described one particular process of manufacturing wood pulp in the carrying out of which sulfite waste liquor results, it is obvious that my broad invention is not to be limited to the treatment of the sulfite waste liquor resulting from any particular process.

Having thus described my invention, what I claim as new and desire to secure by Letters Patent, is:

1. The method of treating sulfite waste liquor which consists in partially evaporating said liquor, treating said liquor with a reagent consisting in part at least of a halogen salt of an alkali metal and subsequently precipitating from out of the liquor substances affected by said reagent.

2. The method of treating sulfite waste liquor from wood pulp mills, which consists in partially evaporating said liquor, treating with a chlorid of an alkali metal said waste liquor and then treating said liquor with barium chlorid to cause precipitation of the sulfur calcium compounds in said liquor as solids.

3. The method of treating sulfite waste liquor from wood pulp mills, which consists in partially evaporating said liquor, adding to said liquor sodium chlorid to assist in coagulating the same, and then bringing barium chlorid into contact with the constituents of said resulting liquor to form precipitates.

4. The method of treating sulfite waste liquor from wood pulp mills, which consists in heating said liquor to concentrate it, adding thereto a chlorid of an alkali metal, agitating, then adding a chlorid of the alkali-earth metal group and agitating to bring the said chlorid into contact with the spent chemical compounds in said liquor to form substantially neutral inert substances.

5. The method of treating sulfite waste liquor from wood pulp mills, which consists in partially evaporating said waste liquor to increase its density, adding a suitable alkaline halogen salt to substantially neutralize the resulting syrup and agitating the same while keeping hot, allowing the syrup to partially cool and then adding a chlorid of the alkali-earth metal group and bringing the same into contact with the syrup to form precipitates.

6. The method of treating sulfite waste liquor from wood pulp mills, which consists in heating the waste liquor to concentrate it and then adding sodium chlorid and agitating the mixture while keeping hot, allowing the mixture to cool to less than 150° Fahr., and then adding barium chlorid as a precipitant agent and bringing the same into intimate contact with the said mixture to form insoluble solids thereof as precipitates.

7. The method of treating hot sulfite waste liquor from wood pulp mills, which consists in evaporating the waste liquor to concentrate it to about 20 to 30 per cent. of solids, then adding sodium chlorid and beating while keeping hot, cooling the syrup to less than 150° Fahr., and then adding a small percentage of barium chlorid and agitating the mixture to bring said chlorid into contact with the mixture to form insoluble precipitates thereof.

8. The method of treating sulfite waste liquor from wood pulp mills, which consists in heating said liquor and adding thereto a chlorid of an alkali metal and beating until separation is evidenced, and then adding a suitable chlorid of the alkali earth metal group to effect separation of the wood derivatives in the mixture.

9. The method of treating sulfite waste liquor from wood pulp mills, which consists in heating said liquor to concentrate it and adding thereto a haloid of an alkali metal and beating until separation is evidenced, allowing the mixture to settle for several hours, adding a suitable haloid of the alkali earth metal group and agitating to bring the same in contact with the mixture to effect precipitation.

10. The method of treating sulfite waste liquor from wood pulp mills, which consists in partially evaporating said liquor and adding thereto a haloid of an alkali metal and beating until separation is evidenced, and then adding a suitable chlorid of the alkali earth metal group and agitating to effect separation of the lignin-cellulose constituents from the spent bisulfite ingredients of said liquor.

11. The method of treating sulfite waste liquor from wood pulp mills, which consists in partially evaporating said waste liquor to concentrate it to increase its density, adding a haloid of an alkali metal and beating the same while keeping it hot, allowing the syrup to partially cool and then adding a chlorid of the alkali earth metal group and agitating to bring the same into contact with the syrup to form precipitates, and then bleaching the resulting syrup.

12. The method of treating sulfite waste liquor from wood pulp mills, which consists in evaporating the waste liquor to concentrate it to about 20 to 30 per cent. of solids, then adding sodium chlorid while keeping hot, and beating, partially cooling the syrup to less than 150° Fahr., then adding a small percentage of barium chlorid and agitating the mixture to bring said chlorid to form insoluble precipitates thereof, and then bleaching it.

13. The method of treating sulfite waste liquor from wood pulp mills, which consists in evaporating the waste liquor to about 20 to 30 per cent. of solids, then adding sodium chlorid while keeping hot, and beating, partially cooling the syrup to less than 150° Fahr., and then adding a small percentage of barium chlorid and agitating to form insoluble precipitates thereof, and then drawing the syrup off from said precipitates.

14. The method of treating sulfite waste liquor from wood pulp mills, which consists in partially evaporating said liquor, adding to said liquor sodium chlorid, then treating the resulting syrup with a chlorid of the alkali earth metal group to cause precipitation of certain of the spent chemical compounds in said liquor, and then drawing off the resulting substance from said precipitates and evaporating it.

15. The method of treating sulfite waste liquor from wood pulp mills, which consists in evaporating the waste liquor to about 20 to 30 per cent. of solids, then adding sodium chlorid while keeping the liquor hot, and beating said syrup until separation is evidenced, running said resulting mixture into a settling tank, and partly cooling the same, then adding a small percentage of barium chlorid as a precipitating agent, and then agitating the mixture to bring said chlorid into intimate contact with the mixture to form insoluble precipitates thereof, bleaching the mixture, and then evaporating the same.

16. The method of treating sulfite waste liquor from wood pulp mills, which consists in evaporating the waste liquor to about 20 to 30 per cent. of solids, then adding sodium chlorid while keeping hot, sufficient to substantially neutralize the resulting syrup and beating, partially cooling the syrup to less than 150° Fahr., and then adding a small percentage of barium chlorid and agitating the mixture to bring said chlorid into intimate contact with the spent chemical compounds of the mixture to form insoluble precipitates thereof, then drawing off the resulting syrup from said precipitates, bleaching said syrup and evaporating the same down to an anhydrous mass, and reducing said mass to a powder.

17. An anhydrous composition of matter made from sulfite waste liquor by concentrating, treating the same with a haloid of an alkali metal, precipitating by the use of barium chlorid the sulfur calcium compounds of the resulting mixture, and evaporating the mixture to a dry mass.

In testimony whereof I affix my signature, in the presence of two subscribing witnesses.

WALTER K. FREEMAN.

Witnesses:
 JNO. S. GEORGE,
 CLARENCE W. HODGE.